United States Patent [19]

Ice et al.

[11] Patent Number: 4,461,018

[45] Date of Patent: Jul. 17, 1984

[54] DIFFRACTION CRYSTAL FOR SAGITTALLY FOCUSING X-RAYS

[75] Inventors: Gene E. Ice; Cullie J. Sparks, Jr., both of Oak Ridge, Tenn.

[73] Assignee: The United States of America as represented by the United States Department of Energy, Washington, D.C.

[21] Appl. No.: 385,993

[22] Filed: Jun. 7, 1982

[51] Int. Cl.[3] .............................................. G01N 23/20

[52] U.S. Cl. .......................................... 378/84; 378/82

[58] Field of Search ......................... 378/82, 83, 84, 85

[56] References Cited

U.S. PATENT DOCUMENTS 3,927,319 12/1975 Wittry .................................. 378/85

OTHER PUBLICATIONS

"Ellipsoidal and Bent Cylindrical Condensing Mirrors for Synchrotron Radiation", Howell et al., Nuclear Instruments and Methods, 125, 1975, pp. 225–230.

"A Separated Function Focusing Monochromator System for Synchrotron Radiation", Hastings et al., Nuclear Instruments and Methods, 152, 1978, pp. 167–171.

"X-Ray Research with Synchrotron Radiation Sources", Sparks et al., Oak Ridge National Labs, Report #5672, 10/24/80.

"X-Ray Curved Crystal Monochromator System at the Storage Ring DCI", Lemonnier et al., Nuclear Instruments and Methods, 152, 1978, pp. 173–177.

"X-Ray Monochromator Geometry For Focusing Synchrotron Radiation Above 10KeV", Sparks et al., Nuclear Instruments and Methods, 172, 1980, p. 237.

"Synchrotron Radiation Facilities in the United States", Rowe, Physics Today, May, 1981, pp. 28–37.

*Primary Examiner*—Craig E. Church

*Attorney, Agent, or Firm*—Fred O. Lewis; Stephen D. Hamel; Michael F. Esposito

[57] ABSTRACT

The invention is a new type of diffraction crystal designed for sagittally focusing photons of various energies. The invention is based on the discovery that such focusing is not obtainable with conventional crystals because of distortion resulting from anticlastic curvature. The new crystal comprises a monocrystalline base having a front face contoured for sagittally focusing photons and a back face provided with rigid, upstanding, stiffening ribs restricting anticlastic curvature. When mounted in a suitable bending device, the reflecting face of the crystal can be adjusted to focus photons having any one of a range of energies.

10 Claims, 7 Drawing Figures

IDEALLY BENT

DISTORTED BY
ANTICLASTIC CURVATURE

DIFFRACTION CRYSTAL FOR SAGITTALLY FOCUSING X-RAYS

The invention is a result of a contract with the U.S. Department of Energy.

BACKGROUND OF THE INVENTION

This invention relates generally to x-ray crystal optics and more particularly to methods and apparatus for focusing synchrotron x-radiation.

Synchrotron x-ray sources are being used in a wide variety of research experiments and may prove useful in industrial applications. The advent of such sources has generated a need for an efficient and practical monochromator which is capable of sagittally focusing synchrotron x-radiation at any one of a range of energy levels. That is, the monochromator should have the capability of accepting x-radiation which is widely divergent in the plane of orbit (the horizontal plane) and focusing that radiation in a plane which is perpendicular to the meridian (scattering) plane. This concentrates and intensifies the accepted radiation. In addition, the monochromator optics should be made adjustable to accomodate various x-ray energies, since a synchrotron source generates radiation over a wide spectrum. So far as is known, these two requirements have not been met by any previously developed monochromator.

It is well known that photons may be focused by specular reflection from mirror surfaces and by diffraction from crystallographic planes. For photon energies exceeding about 10 keV, however, mirrors must be made large in order to intercept the divergent radiation from a synchrotron. In addition, sagittal focusing with mirrors requires very small bending radii; thus, only small divergencies may be intercepted. Diffraction crystals are more desirable for x-ray optics, since they both focus and monochromate divergent radiation. Sagittal focusing of x-radiation has been achieved previously with non-adjustable (fixed-radius) crystals mounted in a confining support, such as a crystal whose convex back surface is fitted in a mating recess in a substrate. Doubly curved diffraction crystals may be used in x-ray monochromators but they introduce complexities which render them useful for fixed energies, Recently, geometries have been derived which show that simple shapes can be configured which are useful for a large range of energies from 2 keV to 1,000 keV. The radius of these cylindrically and (preferably) conically curved crystals can be readily chosen (for energies from 2 keV to 1,000 keV) to eliminate the error introduced by the external shape of the crystals. Thus, a single optical element may efficiently effect both monochromatization and focusing of synchrotron radiation for a wide spectrum of energies and magnifications. [Report ORNL 5672, pp. 53–55 (Oct. 24, 1980), Oak Ridge National Laboratory, Oak Ridge, Tenn.].

Synchrotrons and their applications are described in *Physics Today* (May 1981), special edition entitled "Synchrotron Radiation". The sagittal focusing of synchrotron x-radiation with a confined (fixed-radius) mosaic diffraction crystal is described in *Phys. Rev. Lett.* 40 (1978), 507. The meridian focusing of synchrotron radiation in a horizontal plane by means of a cylindrically curved, elongated triangular crystal is described in *Nucl. Inst. and Meth.*, 152 (1978) pp. 173–177; the crystal is cantilevered and may be tuned for various wavelengths by adjusting a screw which bears on the free end of the crystal. The concept of sagittally focusing synchrotron radiation at energies above 10 keV with a fixed magnification of $\sim\frac{1}{3}$ and crystals having a simple cylindrical curvature is described in *Nucl. Instr. and Meth.* 172 (1980), pp. 237–242. A conceptual double-crystal monochromator utilizing a conically curved crystal to effect improved sagittal focusing at magnifications from $\sim\frac{1}{3}$ to 2 is proposed in the above-referenced report (ORNL 5672 page 55).

SUMMARY OF THE INVENTION

It is an object of this invention to provide a new method, geometry, and apparatus for sagittally focusing x-radiation.

It is another object to provide improved crystal optics for accomplishing such focusing.

It is another object to provide an x-ray monochromator having a focusing crystal which can be tuned to sagittally focus radiation at various energy levels.

It is another object to provide a novel diffraction crystal for focusing x-rays.

Other objects and advantages of the invention will be made apparent hereinafter.

In one aspect, the invention is a diffraction crystal comprising a planar monocrystalline base, a face of which is provided with a plurality of rigid, upstanding, generally parallel ribs. In another aspect, the invention is an arcuate diffraction crystal, said crystal having a concave front surface contoured for sagittally focusing photons and having a back surface which is formed with a plurality of laterally spaced rigid ribs extending transversely of the curvature of said front surface. In still another aspect, the invention is a non-dispersive, double-crystal monochromator for x-radiation, said monochromator including (a) means for receiving x-radiation and reflecting the same as a divergent beam and (b) a diffraction crystal which defines an arc, said crystal having a concave surface for sagittally focusing said beam and having a back surface whose central section is provided with a plurality of spaced stiffening ribs extending transversely of said arc.

DETAILED DESCRIPTION OF THE INVENTION

Figure 1:
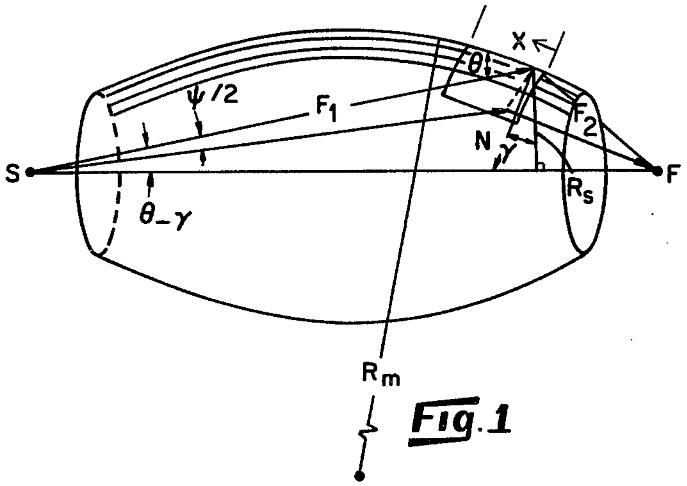
FIG. 1 shows the geometry of a doubly curved crystal surface for near-ideal focusing of x-rays by Bragg scattering.

The invention is based on x-ray tracing calculations and on findings made during experiments directed toward determining the sagittal-focusing performance of a conically curved silicon diffraction crystal. The concept of using a conically shaped crystal to sagittally focus x-rays is new to x-ray optics. Referring to FIG. 1, (which shows a doubly curved crystal surface for the near-ideal focusing of x-rays by Bragg scattering) a simpler, singly curved surface approximation has been found in the shape of a cylindrical or a conical surface which permits dynamic shaping to effect focusing of x-rays of any energy. Referring to FIG. 1, the description of the radius of curvature of the crystallographic planes which minimizes the error in Bragg angle of the most divergent x-rays, $\psi/2$ away from the central ray traveling along $F_1$, is given by $$N = N_o\left[1 + \frac{(3F_2 - F_1)}{2F_1F_2}x\right],$$

where x is the distance from the downstream edge of the crystal.

In our experiments, laser light (simulating x-radiation) was directed onto the reflecting face of the crystal while the latter was mounted in a bending device maintaining the crystal in the shape of a segment cut from the side of a cone. To permit tuning of the crystal to various energy levels, the bending device was designed to support the crystal only at its edges; most of the surface of the crystal was not confined by its support.

Figure 2:
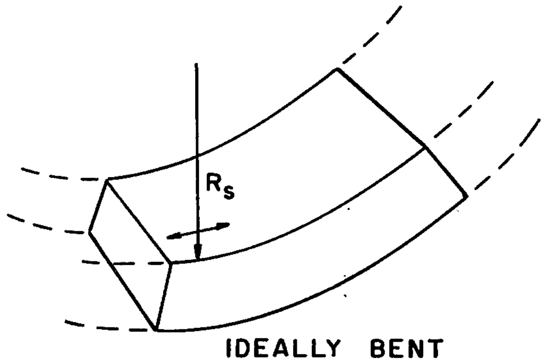
FIG. 2 is a diagram showing the ideal curvature of a rectangular diffraction crystal maintained in a bent condition for focusing x-radiation, FIG. 3 (not to scale) illustrates the actual shape assumed by the crystal because of anticlastic curvature.
Figure 3:
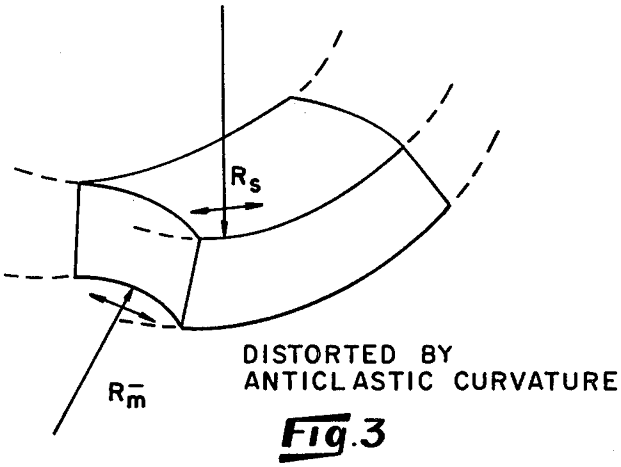

Contrary to calculations, the bent crystal did not produce sagittal focusing. Additional experiments established that the shape of the crystal did not closely approach the ideal conical segment (FIG. 2) but instead assumed a somewhat distorted shape (FIG. 3) because of anticlastic curvature. As shown, one of the crystal faces was dished transversely, whereas the opposite face was bowed transversely. In FIGS. 2-3, the intended radius is designated as $R_s$, the anticlastic radius is designated as $R_{\overline{m}}$.

Figure 4:
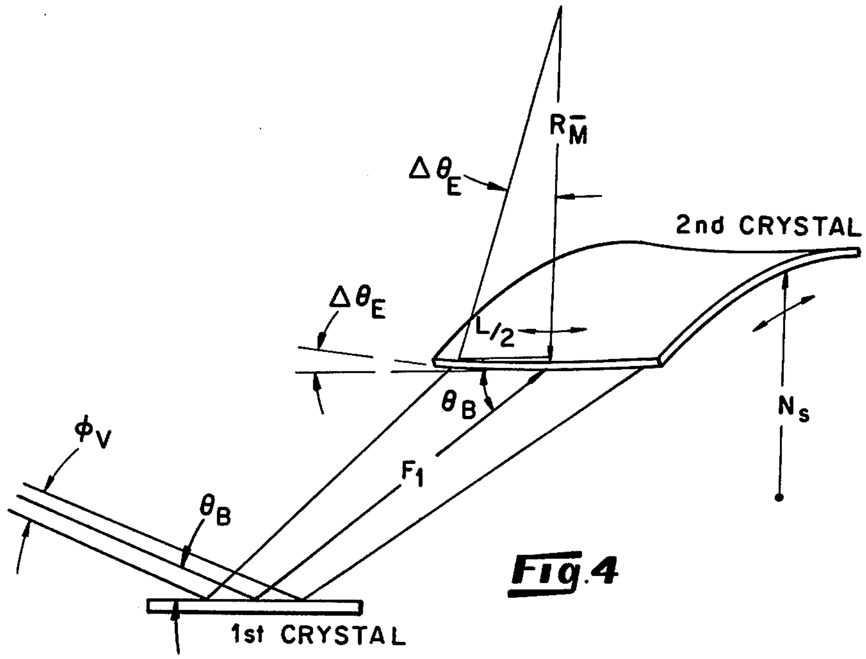
FIG. 4 is a ray diagram for a conventional two-crystal x-ray monochromator and indicating an error, $\Delta\theta_E$, resulting from anticlastic curvature of the second crystal of the monochromator.

Referring to FIG. 4, the transverse curvature $R_{\overline{m}}$, of a conventional diffraction crystal subjected to pure bending in a plane of symmetry is related to the intended radius, $N_s$, by $R_{\overline{m}}=N_s/\sigma$, where $\sigma$ is Poisson's ratio. We have found that the anticlastic curvature, $R_{\overline{m}}$ of conventional bent crystal produces an error, $\Delta\theta_E$, which increases for the more vertically divergent rays. The error in Bragg angle for a small vertical divergence is given by $\Delta\theta_E=F_{1v}/2R_{\overline{m}}\sin\theta$, where $\phi_v$ is a typical opening angle for 90% of the radiation from a 2.5 GeV storage ring. For maximum radiation intensity, this error ($\Delta\theta_E$) should be smaller than the angular range over which the crystal diffracts—i.e., the acceptance angle $\Delta\theta_B$.

Figure 5:
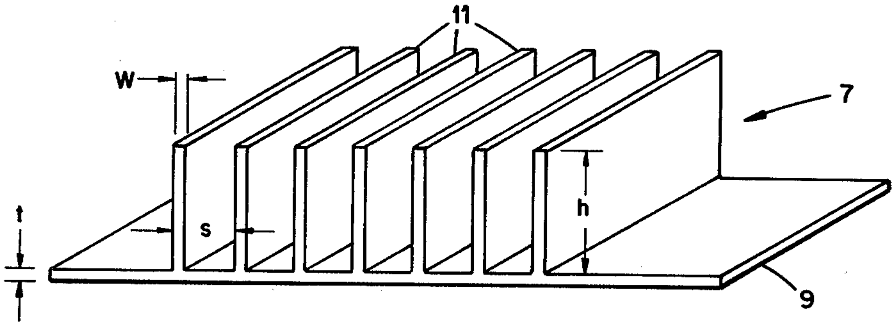
FIG. 5 is a perspective view of a ribbed diffraction crystal designed in accordance with the invention.

As a result of our findings regarding the adverse effects of anticlastic curvature of sagittal focusing, we have developed a diffraction crystal which can be bent in a plane of symmetry to provide a reflective surface which is characterized by relatively little anticlastic distortion in the meridian plane. (Merely thickening the crystal will not solve the problem.) A preferred form of the new focusing element is illustrated in FIG. 5, where the numeral 7 designates an unbent polished monocrystalline (111) silicon crystal consisting of an elongated and relatively thin rectangular base 9 provided with spaced, upstanding ribs 11, which extend transversely of the plane in which the crystal is to be bent. As will be described, the ribs are designed to restrict anticlastic curvature and thus enhance sagittal focusing. The ribbed crystal may be formed in any suitable manner, as by machining a block of monocrystalline silicon or other diffraction-crystal material or, alternatively, a bendable substrate on which a thin diffracting film is to be deposited. If desired, the machined surfaces may be etched, as by immersing them in a 95:5 mixture of 70% $HNO_3$ and 48% HF aqueous solutions in an ice bath, in order to remove distorted material and improve the bendability of materials such as silicon.

Ribbed crystals designed in accordance with the invention may have various dimensions, depending on where and how they are to be used. As a specific example, the above-mentioned crystal (FIG. 5) had the following dimensions: base, 7.6 cm long by 3.5 cm wide by 0.5 mm thick; ribs: 1 cm high by 3.5 cm wide by 0.5 mm thick; rib-to-rib spacing, 2.0 mm. The junctions of the ribs were formed with 0.12 mm radii to reduce stress sensitivity. The height, spacing, and width of the ribs 11 determine the resistance of the crystal to anticlastic bending. In the thin-plate approximation and assuming an elastically isotropic material, the relationship betwen the bending radius, $N_s$, and the resulting anticlastic radius, $R_{\overline{m}}$, for a ribbed crystal approximates:

$$R_{\overline{m}}/N_s\frac{1}{\sigma}\left[1 + \frac{w}{s}\left(\frac{h}{t}\right)^3(1-\sigma^2)\right],$$

where $\sigma$ is Poisson's ratio, and w, s, h, and t represent rib width, spacing, height, and thickness, respectively.

For any magnification of $F_2/F_1$, a silicon (111) crystal located a distance $F_1$ from the radiation source has a sagittal focusing radius, $N_s$, calculated as a function of photon energy from the equation $N_s=2F_1F_2\sin\sigma/(F_1+F_2)$. Table 1 lists the calculated $N_s$ values for various photon energies for a magnification of one and a distance of $F_1=10$ m. Using 0.25 as Poisson's ratio for Si, calculations can be made of the anticlastic radii, $R_{\overline{m}}$, assumed by a thin rectangular Si (111) plate bent to the radii, $N_s$. These anticlastic radii, $R_{\overline{m}}$, also listed in the Table, are used to calculate the error $\Delta\sigma_E$ for the most extreme rays. As shown in Table I, $\Delta\sigma_E$ is larger than the acceptance angle $\Delta\sigma_B$ by a factor of 5 at 5 keV, of 22 at 10 keV, and of 641 at 40 keV. Thus, the use of unreinforced crystals for sagittal focusing of synchrotron radiation will result in a reduction of the vertical divergence accepted by just the ratio $\Delta\sigma_E/\Delta\sigma_B$. To ensure that diffraction occurs, we prefer to limit the error, $\Delta\theta_E$, to about one-fifth of the angular range of the crystal reflecting width. These permissible anticlastic radii are listed in Table I. As shown in the table, the necessary height of the ribs increases with increasing x-ray energy. Because the crystal surface under the ribs does not bend, the minimum horizontal focal width that can be achieved for even a point source at a magnification (M) of one is two times the rib width. Thus, the source size influences the choice of rib width, height, and spacing.

TABLE I

| Energy (keV) | V (mrad) | B (deg) | $\Delta\theta_B$ (mrad) | $N_s$ (m) | $R_m^{-a}$ (m) | $\Delta\theta_E$ (mrad) | $R_m^{-b}$ (m) | h (mm) |
|---|---|---|---|---|---|---|---|---|
| 5 | 0.34 | 23.24 | 0.055 | 3.94 | 15.78 | 0.273 | 391.7 | 2.5 |
| 10 | 0.21 | 11.38 | 0.031 | 1.97 | 7.89 | 0.674 | 872.4 | 4.2 |
| 20 | 0.15 | 5.66 | 0.015 | 0.99 | 3.95 | 1.928 | 2534.9 | 7.5 |
| 30 | 0.12 | 3.77 | 0.010 | 0.66 | 2.63 | 3.470 | 4562.6 | 10.5 |
| 40 | 0.10 | 2.83 | 0.008 | 0.49 | 1.98 | 5.128 | 6409.5 | 12.9 |

[a]Anticlastic radius for an unconstrained crystal bent to the sagittal radius $N_s$.
[b]Anticlastic radius permitted for a Bragg angle error of 1/5 $\Delta\theta_B$.

Figure 6:
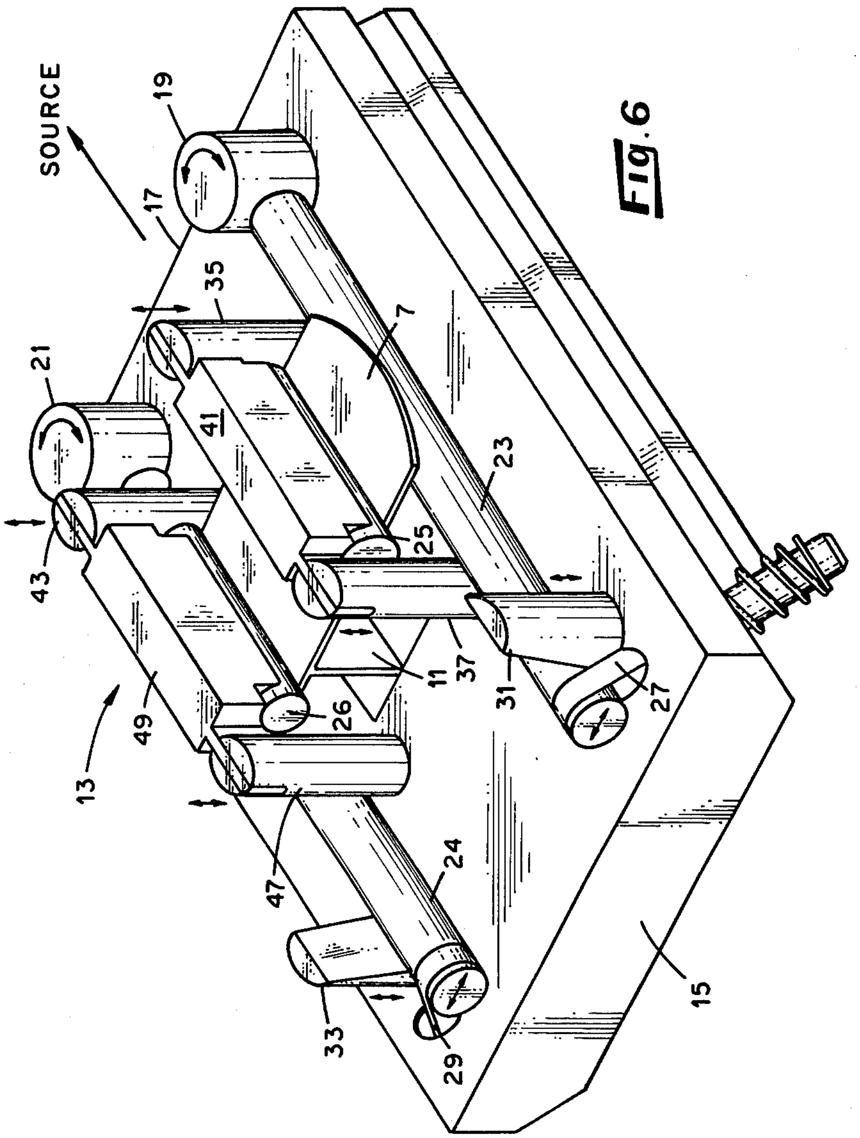
FIG. 6 is a perspective view of a special device for bending a monocrystalline body to a shape approximating either a cylindrical segment or a conical segment and for supporting the same in bent position.

FIG. 6 shows a precision four-point loading device for bending a ribbed diffraction crystal to provide a cylindrical or conical segment suitable for sagittally focusing x-radiation. The bending device may be incorporated in a monochromator and used both to support the bent crystal during operation in a radiation field and to make in-place adjustments of the reflecting surface radii when desired. The device is illustrated as loaded with an unbent ribbed crystal, only one of whose ribs 11 is shown. The bending device includes a rigid and optically flat base 15, an end 17 of which extends toward the radiation source, as indicated. The base carries a plurality of vertical posts and four cylindrical bending rods. Two of the posts (19 and 21) are disposed adjacent to the edge 17 and are rotatable. Two bending rods 23 and 24 rest on the base and have ends affixed to the posts 19 and 21, respectively. The other ends of the rods are engaged individually by spring-loaded straps 27 and 29, which urge the rods against the upwardly tapered faces of two vertically adjustable posts 31 and 33, respectively. The rods are shown in a mutually parallel position; vertical movement of the posts 31 and 33 pivots the rods toward each other.

Mounted between the bending rods 23, 25 are four posts which can be moved individually in the vertical direction. Two of these posts (35 and 37) support an assembly 41 which includes the bending rod 25. The other two posts (43 and 45) support an assembly 49 which includes the bending rod 26. As shown, these inner rods 25 and 26 are elevated with respect to the outer bending rods 23, 24 and are parallel therewith. The assemblies 42 and 49 are made removable to permit an unbent diffraction crystal to be loaded in the bending device, as shown. Any suitable means, such as conventional electric motors and gearing, may be used to position the various posts precisely. The base 15 is formed with a cutout for accomodating the ribs.

The bending device is designed to apply either uniform or nonuniform bending moments as well as twist to the crystal. With the posts positioned as shown, the crystal can be bent to cylindrical shape by simultaneously driving the inner posts 35, 37, 45, and 47 downward a selected amount. Alternatively, a conical shape can be obtained by driving the posts 31 and 33 upward to displace the outer bending rods to a non-parallel position and then driving the four inner posts downward. Again, a conical shape can be obtained by driving the posts 37 and 47 downward, or upwards relative to posts 35 and 43. For our application, the bending radius of the crystal is larger at the end curved by posts 37 and 47.

It will be apparent that the shape of a bent crystal also can be fine-tuned by altering the positions of selected posts. Twists in the crystal can be removed by a downward motion applied to posts 37 and 43, with an upward motion applied to posts 35 and 47, or vice versa. Tilt of the crystal about the axis of the central ray and the application of uneven bending moments can also be effect with the four independently movable posts.

EXAMPLE

Experiments were conducted to determine the sagittal-focusing performance of ribbed silicon (111) crystals designed as shown in FIG. 5 and dimensioned as described above but with rib heights of both 1.0 and 1.4 cm. Each crystal was bent to conical-segment shape in a bending device of the kind shown in FIG. 5. The four bending rods had diameters of 9.4 mm, the outer rods being spaced 6.6 cm apart and the inner rods 4.2 cm apart. The spacing between each inner bending rod and the rib nearest thereto was 2 mm. The precision of the bending rod aovements was 0.1 μm.

Figure 7:
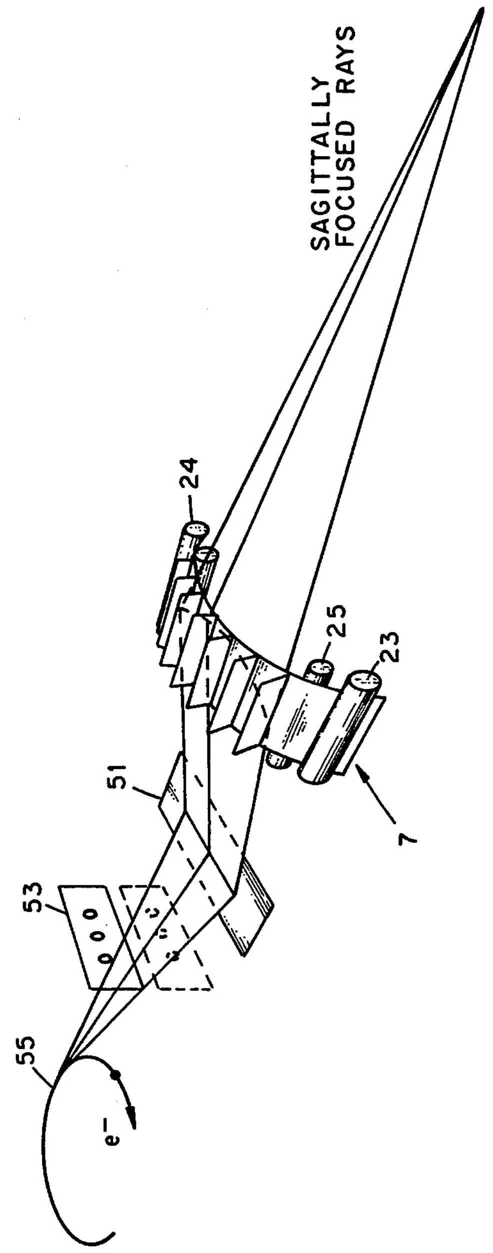
FIG. 7 is a diagram illustrating ray paths in a double-crystal x-ray monochromator including a conically curved crystal designed in accordance with the invention, the monochromator being mounted to receive x-radiation from a synchrotron source.

Following a bending operation, the loaded bending device was incorporated in a non-dispersive double-crystal monochromator including a conventional silicon (111) flat crystal. The monochromator was mounted in a synchrotron-radiation source. FIG. 7 shows the relative positions of the ribbed crystal 7, the flat crystal 51, a perforated lead plate 53, and a storage ring 55. (Only the bending rods of the bending device are shown). The distance between the flat crystal and the photon source was 11 m. Three mrad of horizontal divergence and 90% of the vertical divergence was intercepted by the bent crystal. The two crystals were mounted on independent axes for rotation and were displaced from each other by 5 cm in the vertical direction. An ionization chamber was inserted between the first and second crystal and another immediately following the second crystal. Because of the high radiation background in the first ionization chamber, the efficiency of the bent second crystal as an element in a two-crystal monochromator was obtained by comparing the output of the second chamber when the second crystal was unbent to the output when the crystal was bent for optimum focus. Visual observations of the focusing were made at a point 21 m from the source with a ZnS fluorescent screen, TV camera and monitor. Rocking curves of the bent and unbent crystals were made to measure the distortions introduced by bending.

Table II lists the radii, $N_s$, to which the crystals were bent, the measured width of the rocking curves, $\Delta\theta$ unbent and $\Delta\theta$ bent, and the % of the radiation diffracted by the curved crystal compared to its unbent state. The rocking curve widths and the vertical height of the horizontally focused beam were found to approach the values for a flat crystal, showing that the provision of the ribs 11 had eliminated most of the anticlastic bending incurred with conventional crystals.

TABLE II

| Energy (keV) | B (deg) | $\Delta\theta$ Unbent (arc sec) | M | $N_s$ (m) | $\Delta\theta$ Bent (arc sec) | Diffraction Efficiency (%) |
|---|---|---|---|---|---|---|
| 10 | 11.38 | 8.9 | 0.9 | 2.1 | 8.9 | 95 ± 3 |
| 10 | 11.38 | 8.9 | 0.3 | 1.1 | 8.9 | 95 ± 3 |
| 20 | 5.66 | 4.4 | 0.9 | 1.0 | 5.6 | 80 ± 10 |
| 30 | 3.77 | 2.9 | 0.9 | 0.7 | 4.7 | 50 ± 10 |

The above-mentioned lead plate (55, FIG. 7) was formed with three holes having diameters of ¼ mm and spaced 1 cm apart. The 2 (standard deviation) radiation source size was 4.2 mm wide and 0.5 mm high. Thus, an actual size image of the source should have been observed at M≃1 if the curved crystal is not distorting the image. Photographic film placed 21 m from the source and 10 m from the pinholes was used to record the source size for M≃0.9. An exposure was made through each pinhole separately to determine that each produced an image, and that the crystal focused uniformly. Examination of the exposed film established that focal-spot sizes approximated the 2 dimensions. The three spots were superimposed, verifying that the monochromator was focusing the horizontal divergence to the same central spot.

Our ribbed crystals may be used to sagittally focus more of the large horizontal divergence of synchrotron radiation at energies above 5 keV than mirrors. The ribbed crystals match the meridian divergence from a flat crystal and can be used with high efficiency as the second element of a (1, −1) two-crystal Bragg monochromator. We believe that cylindrically or conically curved ribbed crystals can be used with good diffraction efficiency at photon energies up to at least 40 keV. Because the energy resolution of the monochromator is determined by the first (flat) crystal, a curved second crystal does not adversely affect energy resolution. If desired, a mirror focusing in the meridian plane can be used to effect the vertical focusing. The conventional technique of using a cantilevered triangular crystal to generate a cylindrically curved surface may be conducted with crystals reinforced in accordance with the invention. This would permit the ribbed crystals to be used for sagittally focusing horizontal divergence at $M \simeq \frac{1}{3}$. Our fourpoint bending technique is applicable to the formation of either cylindrical or conical shapes, can be used with rectangular crystals to maximize the amount of radiation intercepted, and keeps the center of curvature bisecting the horizontal divergence during fine-tuning or resetting of the curvature of the reflecting surface.

Given the teachings herein, one skilled in the art will be able to determine the optimum ribbed-crystal parameters for a given application, without resorting to more than routine calculation and/or experimentation. Referring to FIG. 5, the base 9 of the crystal may be of any suitable diffraction material—e.g., monocrystalline silicon, germanium, or other crystals and multilayers. It is within the scope of the invention to form the ribs 11 in any suitable manner. For instance, pre-formed ribs may be adhered to the base 9, assuming that the adhesive does not deform the crystallographic planes excessively. The ribs may be composed of a wide variety of materials having suitable moduli of elasticity as, for example, tungsten, molybdenum, silicon carbide, or steel. Our ribbed crystals are not limited to use in monochromators but may be used in various other applications calling for the focusing of radiation. For example, they may be used in x-ray astronomy and laser light to focus radiation from plasmas and salt x-rays.

The foregoing description of the preferred form of the invention has been presented for the purpose of illustration, not limitation, and to enable others skilled in the art to utilize the invention with various embodiments and modifications suited to a particular use. It is intended that the scope of the invention be defined by the appended claims.

What is claimed is:

1. A diffraction crystal comprising a planar monocrystalline base, a face of which is provided with a plurality of rigid, upstanding, laterally spaced ribs.

2. The crystal of claim 1 wherein said crystal is elongated, and said ribs extend transversely thereof.

3. The crystal of claim 1 wherein said crystal is bendable in a plane to form an arc and said ribs extend transversely of said plane.

4. An arcuate diffraction crystal, said crystal having a concave front surface contoured for sagittally focusing photons and having a back surface which is formed with a plurality of laterally spaced rigid ribs extending transversely of the curvature of said front surface.

5. The crystal of claim 4 wherein said ribs, front surface, and back surface are composed of monocrystalline material.

6. A non-dispersive, double-crystal monochromator for x-radiation, said monochromator comprising: (a) means for receiving said x-radiation and reflecting the same as a divergent beam and (b) a diffraction crystal which defines an arc, said crystal having a concave surface for sagittally focusing said beam and having a back surface whose central section is provided with a plurality of spaced stiffening ribs extending transversely of said arc.

7. The monochromator of claim 6 further including means for supporting the end sections of said crystal, said means including (a) two elongated rigid members for transversely engaging respective end sections of said concave surface and (b) two elongated rigid members for transversely engaging respective end sections of said back surface, the latter two members being disposed inwardly of the other two members.

8. The monochromator of claim 7 wherein all of said members are mounted for movement toward and away from said crystal.

9. The monochromator of claim 7 wherein said means is one of a flat mirror and a flat crystal.

10. The monochromator of claim 9 wherein the supported crystal has a configuration approximating a conical segment.

* * * * *